(12) United States Patent
Lin

(10) Patent No.: US 6,778,006 B2
(45) Date of Patent: Aug. 17, 2004

(54) PERIPHERAL DEVICE FOR CONTROLLING POWER IN A PORTABLE ELECTRONIC DEVICE

(75) Inventor: Hwan-Rong Lin, Changhua (TW)

(73) Assignee: Darfon Electronics Corp., Taoyuan (TW)

(*) Notice: Subject to any disclaimer, the term of this patent is extended or adjusted under 35 U.S.C. 154(b) by 21 days.

(21) Appl. No.: 10/342,890

(22) Filed: Jan. 14, 2003

(65) Prior Publication Data
US 2003/0132737 A1 Jul. 17, 2003

(30) Foreign Application Priority Data
Jan. 16, 2002 (TW) .......................... 91100575 A

(51) Int. Cl.$^7$ .............................................. G05F 1/10
(52) U.S. Cl. ............................................... 327/540
(58) Field of Search ........................... 327/63, 77, 530, 327/534, 535, 537, 538, 540, 541, 543

(56) References Cited
U.S. PATENT DOCUMENTS
4,617,473 A * 10/1986 Bingham ..................... 307/66
5,315,549 A * 5/1994 Scherpenberg et al. 365/189.09
6,259,304 B1 * 7/2001 Sheng et al. ................. 327/408

* cited by examiner

Primary Examiner—Jeffrey Zweizig
(74) Attorney, Agent, or Firm—Ladas & Parry

(57) ABSTRACT

A peripheral device for controlling power in a portable electronic device. The peripheral device is coupled to an output port of the portable electronic device to control voltages of a first pin and a second pin. After a period of no use, the portable electronic device enters sleep mode. After an input signal is received by the peripheral device, the portable electronic device is woken and enters work mode. The peripheral device comprises an input device controller and an interface circuit. The input device controller comprises a gate connecting port, a clock signal port, an input port and a port for detecting voltage. The interface circuit comprises a first diode, a second diode, a capacitor, a resistor and a PNP transistor.

18 Claims, 3 Drawing Sheets

PERIPHERAL DEVICE FOR CONTROLLING POWER IN A PORTABLE ELECTRONIC DEVICE

BACKGROUND OF THE INVENTION

1. Field of the Invention

The present invention relates in general to a peripheral device for a portable electronic device. In particular, the present invention relates to a peripheral device for controlling power in a portable electronic device.

2. Description of the Related Art

Portable electronic devices have power-saving capabilities, such that they can enter a power-saving or sleep mode automatically if unused for a preset time. A restart key or sequence on the portable electronic device must be used to restore the active mode. However, users may use many types of peripheral devices (such as external keyboard or joystick). In some cases, restoration is unavailable without returning to the restart key or sequence on the portable electronic device and possibly even disconnecting the peripheral device is needed.

A connection pin of a transmission cradle in the portable electronic device comprises (a) High Speed Interface (HSI) pin and (b) transmit data/power (TXD) pin. When the portable electronic device is in sleep mode, the HSI pin maintains a high voltage. When the portable electronic device is connected to the transmission cradle and a "synchronous key" is pressed, the HSI pin is connected to ground and the voltage goes to 0V to drive or woken the portable electronic device. Then, the portable electronic device enters normal operation or work mode to start the synchronization procedure. When the portable electronic device is in sleep mode, the TXD pin maintains a low voltage. During data transmission between the portable electronic device and the transmission cradle, the TXD pin maintains a high voltage. The TXD pin is taken as a power source with a 2.7V output voltage and a 3 mA maximum current.

There are 2 steps needed, when a portable electronic device switching from sleep mode to work mode. 1. Input an applied signal with low voltage to the HSI pin, 2. The portable electronic device need a period of time, for example 400 ms, driving the device into work mode. 3. The TXD pin of the portable electronic device starts to supply power to the peripheral device. However, there is no power supplied from the portable electronic device to the peripheral device for about 400 ms. That may possibly cause the peripheral device unstable.

SUMMARY OF THE INVENTION

Accordingly, the object of the present invention is to provide a peripheral device for a portable electronic device. The peripheral connecting device in sleep mode is woken by input from the peripheral device without pressing a restart key on the portable electronic device.

To the above purpose, the present invention provides a peripheral device for controlling power in a portable electronic device. The peripheral device is coupled to an output port of the portable electronic device to control voltages of a first pin and a second pin. The peripheral device can detect the voltage of the second pin to determine if the portable electronic device is in sleep mode or in work mode. The peripheral device comprises an input device controller and an interface circuit.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

Figure 1:
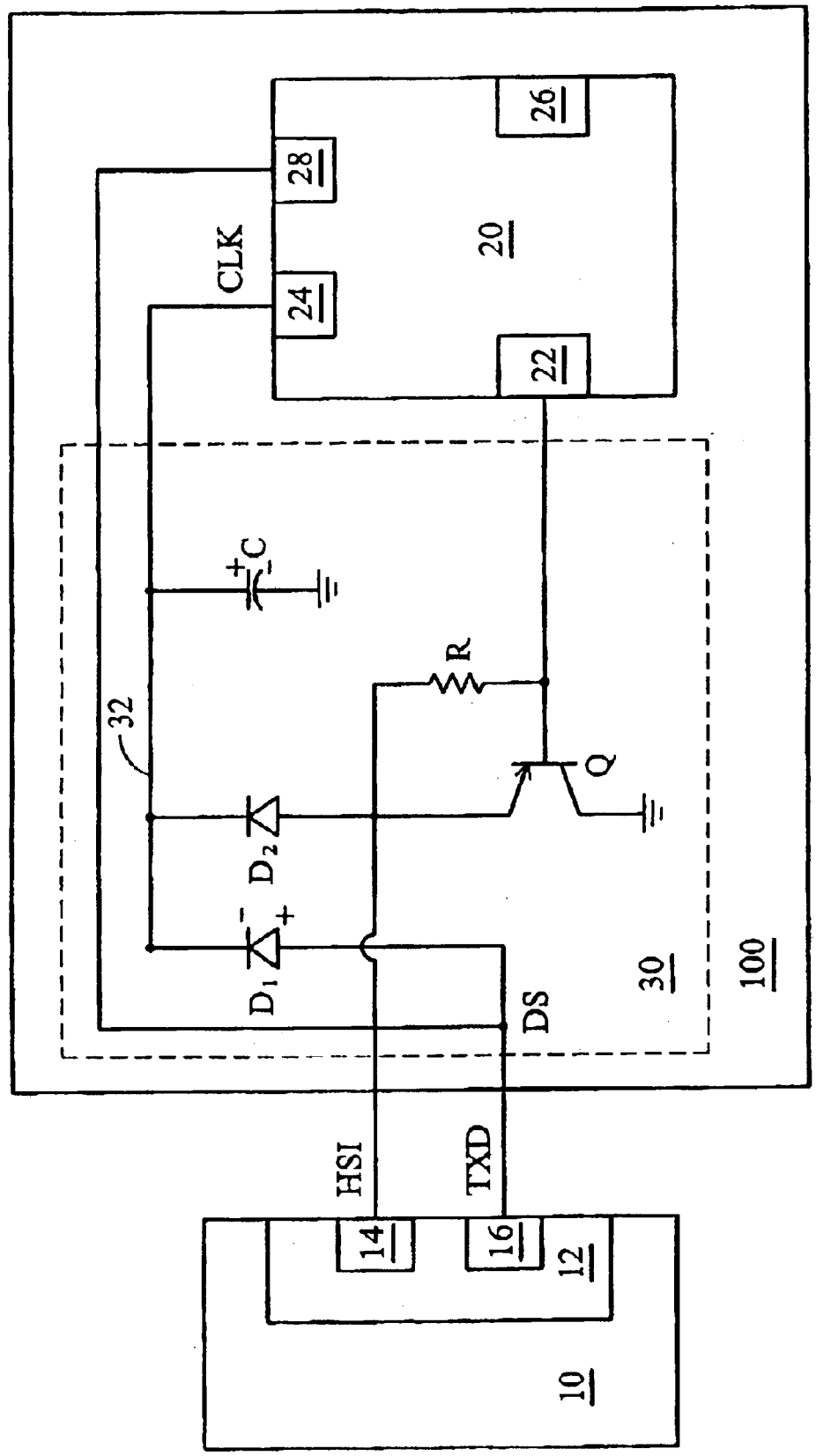
FIG. 1 is a diagram illustrating the configuration of a peripheral device in the embodiment of the present invention.

FIG. 1 is a diagram illustrating the configuration of a peripheral device in the embodiment of the present invention. The peripheral device 100 is coupled to an output port 12 in a portable electronic device 10 to control voltages of a first pin 14, HSI pin, and a second pin 16, TXD pin. The peripheral device 100 comprises an input device controller 20 and an interface circuit 30. The input device controller 20 may be an 8-bit low power processor such as EM78P451 produced by the EMC. The interface circuit 30 is coupled the portable electronic device 10 and the input device controller 20. In the embodiment of the invention, the input device controller 20 is a controller of a keyboard (not shown in FIG. 1) and the interface circuit 30 is built in the keyboard.

The first pin 14 and the second pin 16 are on the output port 12. The second pin 16 drives the portable electronic device 10. The voltage output from the first pin 14 is HSI. The voltage output from the second pin 16 is DS.

The input device controller 20 comprises a gate connecting port 22, a clock signal port 24, an input port 26 and a port for detecting voltage 28. The clock signal port 24 is coupled to a first connecting point 32 and produces a clock signal CLK to input to the interface circuit 30. The port for detecting voltage 28 is coupled to the second pin 16 to detect the voltage DS.

The interface circuit 30 comprises a first diode D1, a second diode D2, a capacitor C, a resistor R and a PNP transistor Q. An anode of the first diode D1 is coupled to the second pin 16. A cathode of the first diode D1 is coupled to the first connecting point 32. The capacitor has two terminals. One terminal of the capacitor C is coupled to the connecting point 32. The other terminal of the capacitor C is coupled to ground. The voltage of the capacitor C is Vc. A gate of the PNP transistor Q is coupled to the gate connecting port 22 and the first pin 14 through the resistor R. A source of the PNP transistor Q is coupled to the first pin 14. A drain of the PNP transistor Q is coupled to ground. An anode of the second diode D2 is coupled to the first pin 14. A cathode of the second diode D2 is coupled to the first connecting point 32.

In the embodiment, the portable electronic device 10 has two operating modes: (a) work mode and (b) sleep mode. The portable electronic device 10 requires power in work mode, but saves power in sleep mode.

The capacitor C can store some power when the portable electronic device 10 is in sleep mode. The power is supplied from the first pin 14 and the second pin 16. In addition, when the capacitor C is discharged, the current is not fed back to the PNP transistor Q using the first diode D1 and the second diode D2.

In the embodiment, when the portable electronic device 10 is in sleep mode, the voltage HSI output from the first pin 14 is 2.9 volts and the capacitor C is charged by the voltage HSI. Then, the voltage of the capacitor Vc is 2.9 volts. After an input signal is input to the input port 26 i.e. the controller of the keyboard receives an input signal, a wake-up signal is output from the gate connecting port 22. The wake-up signal is a low voltage to pull the gate voltage of the PNP transistor low. Then, the voltage HSI is decreased and approached to 0 volts. Therefore, the capacitor C starts being discharged. Because 2 volts is the minimum voltage for the input device controller to operate normally, the voltage of the capacitor Vc must stay above 2 volts. The value of the capacitor C is selected by the equation (1):

$$t = r \times C \times \ln\left(\frac{Vb}{Va}\right)$$

wherein, for example, if r is 300 kΩ (In 3 volts, if the input device controller enters sleep mode, the current of the input device must stay below 10 $\mu A$), t is 400 ms, Vb is 2.9 volts, Va is 2 volts, the minimum value of the capacitor C is 8.9 $\mu F$.

Figure 2:
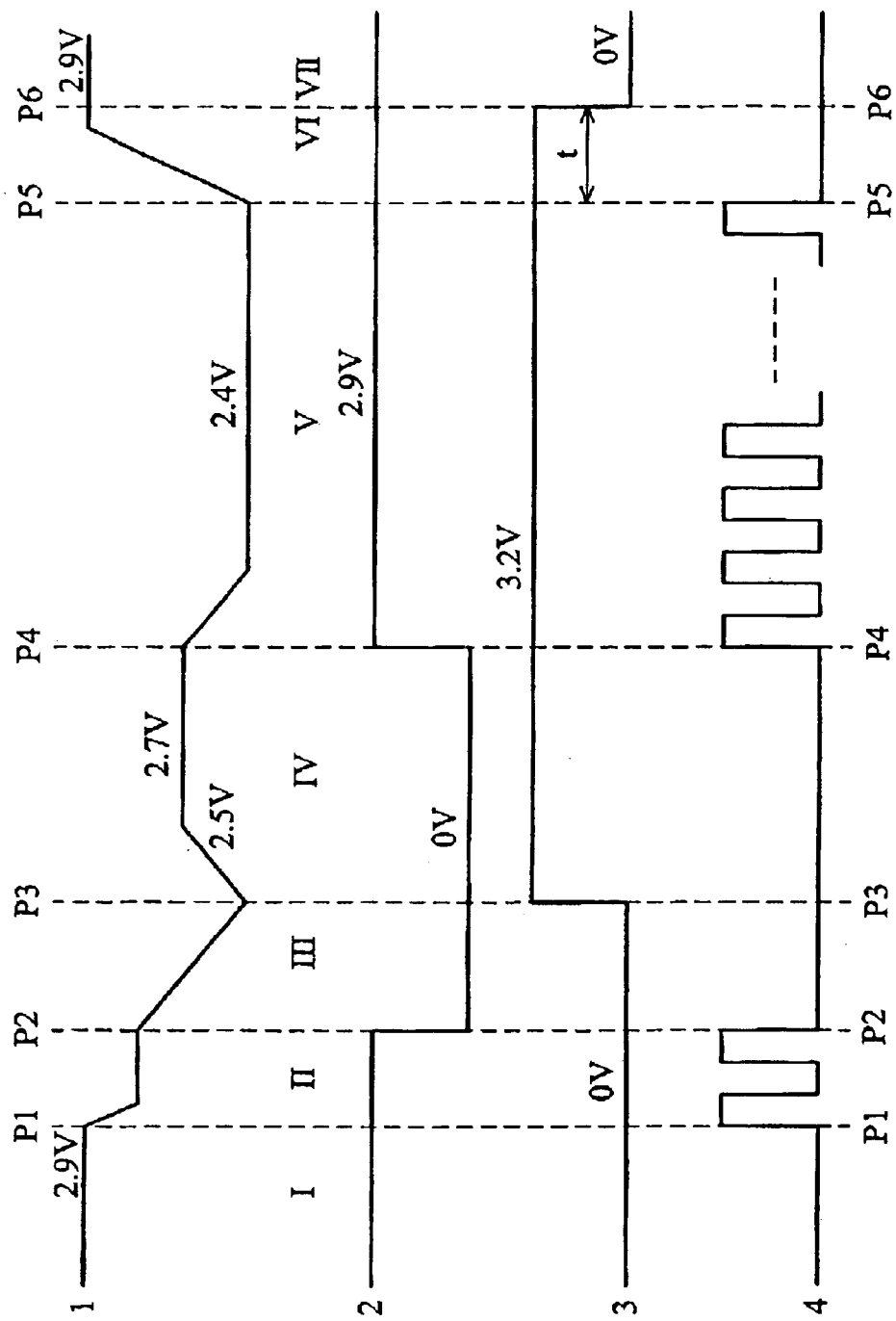
FIG. 2 is a graph illustrating the relation of voltage variations of the points in the peripheral device shown in FIG. 1 and the operating modes of the portable electronic device.

FIG. 2 is a graph illustrating the relation of voltage variations of the points in the peripheral device shown in FIG. 1 to the operating modes of the portable electronic device.

Line 1 is a graph showing the relation between the voltage of the capacitor Vc to the operating modes of the portable electronic device 10. Line 2 is a graph showing the relation between the voltage output from the first HSI pin to the operating modes of the portable electronic device 10. Line 3 is a graph showing the relation between the voltage output from the second pin TXD to the operating modes of the portable electronic device 10. Line 4 is a graph showing the relation between the clock signal CLK to the operating modes of the portable electronic device 10.

Section I~

Before point P1, the portable electronic device 10 and the input device controller 20 are both in sleep mode. The voltage HSI is 2.9 volts. The voltage of the capacitor Vc is 2.9 volts. Because the portable electronic device 10 is not driven, the voltage DS is 0 volts.

Section II~

At point P1, an input signal input from the keyboard is received by the input port 26. Therefore, the input device controller 20 is driven and the change of the clock signal CLK is started.

Section III~

At point P2, i.e. a period after the input device controller 20 is driven, two steps are performed by the input device controller 20.

Step I: The input device controller 20 outputs a wake-up signal from the gate connecting port 22. The wake-up signal is a low voltage to pull the gate voltage of the PNP transistor Q down. Then, the voltage HSI is decreased and goes to 0 volts. Therefore, the capacitor C starts discharging. The voltage of the capacitor Vc is decreased during the section III. At point P3, the voltage of the capacitor Vc becomes 2.5 volts.

Step II: The input device controller 20 starts a watchdog timer and the input device controller 20 enters an controller mode. The timing period of the watchdog timer is between 150 ms and 300 ms. The sum of the duration of the section III and section IV equals the timing period of the watchdog timer. Because, during the timing period of the watchdog timer, the input device controller 20 is in the controller mode, the input port 26 cannot receive input signals and the change of the clock signal CLK is stopped.

Section IV~

At point P3, because the voltage of the capacitor Vc is 2.5 volts, the portable electronic device 10 is driven. The portable electronic device 10 goes from sleep mode to work mode. After the portable electronic device 10 enters work mode, the voltage of the second pin 16 is supplied by the portable electronic device 10. The voltage DS is 3.2 volts, if a fixed voltage for normal operation is 3.2 volts. The capacitor C is charged by the voltage DS. Because the timing period of the watchdog timer comprises the duration of the section V, the voltage HSI is 0V in the section IV.

Section V~

At point P4, the watchdog timer ends and the input device controller 20 exits the controller mode and the voltage HSI goes to 2.9 volts again. Because the input device controller 20 exits the controller mode, the input port can receive input signals. The change of the clock signal CLK restarts. Then, the input device controller 20 transmits the input signals to the portable electronic device 10 through the interface circuit 30. In section V, the portable electronic device 10 is in work mode. Therefore, the voltage DS is 3.2 volts.

Section VI~

At point P5, the user stops inputting from the keyboard. Therefore, the change of the clock signal CLK is stopped. After a predetermined time t (3–10 second) i.e. at point P6, if the user does not input any input signal, the voltage DS goes from 3.2 volts to 0 V and the portable electronic device 10 enters sleep mode. Between point P5 and P6, the voltage HSI is 2.9 volts and the voltage DS is 3.2 volts. However, because the clock signal CLK is not changed, the capacitor C is charged by the voltage HSI. The voltage of the capacitor Vc is increased to 2.9 volts.

Section VII~

At point P6, the voltage DS is 0 volts. The portable electronic device 10 goes from work mode to sleep mode. The voltage HSI is 2.9 volts. The portable electronic device 10 and the input device i.e. keyboard are both in sleep mode.

Figure 3:
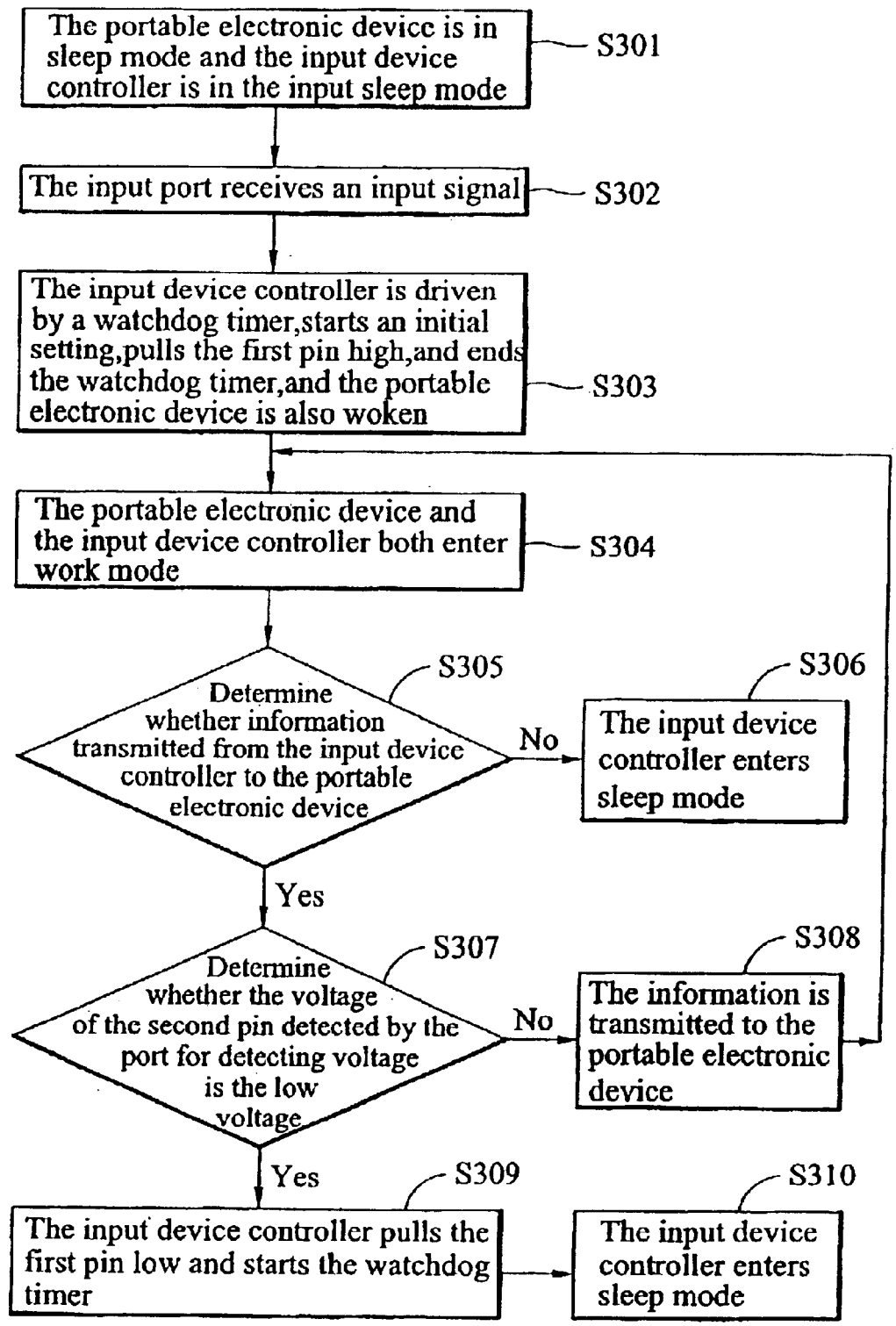
FIG. 3 is a flowchart illustrating the operation of the peripheral device shown in FIG. 1.

FIG. 3 is a flowchart illustrating the operation of the peripheral device shown in FIG. 1. First, the portable electronic device 10 is in sleep mode and the input device controller 20 is in the controller sleep mode (S301) (referring to section I shown in FIG. 2). Then, the input port 26 receives an input signal (S302) (referring to point P1 shown in FIG. 2) After the input port 26 receives the input signal (S302), the input device controller 20 is driven by a watchdog timer and starts an initial setting. The portable electronic device 10 is also woken. The input device controller 20 pulls the first pin high and ends the watchdog timer (S303) (referring to section II~IV shown in FIG. 2). Then, the portable electronic device 10 and the input device controller 20 both enter work mode (S304) (referring to section V shown in FIG. 2).

When the portable electronic device 10 and the input device controller 20 are both in work mode, whether information transmitted from the input device controller 20 to the portable electronic device 10 is determined by judging whether information is received by the input port 26 (S305). If not, the input device controller 20 enters sleep mode (S306). If so, whether the voltage of the second pin detected by the port for detecting voltage 28 is the low voltage is determined (S307) If the voltage of the second pin is not the low voltage, the information is transmitted to the portable electronic device 10 (S308). It the voltage of the second pin is the low voltage, the input device controller 20 pulls the first pin low and starts the watchdog timer (S309). Then, the input device controller 20 enters controller sleep mode (S310).

As described above, the peripheral device of the present invention can save power when the portable electronic device enters sleep mode. In addition, when receiving an input signal, the portable electronic device goes to work mode without using a key thereon.

Finally, while the invention has been described by way of example and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A peripheral device for controlling power in a portable electronic device, the peripheral device coupled to an output port of the portable electronic device and controlled voltages with a first pin and a second pin of the output port, the peripheral device comprising:

an input device controller including a clock signal port coupled to a first connecting point, a voltage detecting port coupled to the second pin to detect a voltage of the second pin, a gate connecting port and an input port; and an interface circuit coupled the portable electronic device and the input device controller including a first diode for conducting electricity from the second pin to the first connecting point, a capacitor with a first end coupled to the first connecting point and a second end coupled to ground, a PNP transistor, a gate of the PNP transistor coupled to the gate connecting port and the first pin through a resistor, a source of the PNP transistor coupled to the first pin and a drain of the PNP transistor coupled to ground, a second diode for conducting electricity from the first pin to the first connecting point.

2. The peripheral device as claimed in claim 1, wherein the portable electronic device has both a work mode and a sleep mode.

3. The peripheral device as claimed in claim 2, wherein, when the portable electronic device is in the sleep mode, the portable electronic device supplies a fixed voltage to the interface circuit through the first pin to charge the capacitor to a high voltage.

4. The peripheral device as claimed in claim 3, wherein the fixed voltage and the high voltage of the capacitor are 2.9 volts.

5. The peripheral device as claimed in claim 2, when the portable electronic device is in the sleep mode and an input signal input to the input port, a wake-up signal is output from the gate connecting port, a wake-up timer is started by the input device controller and the input device controller enters into a controller sleep mode until the wake-up timer ends, wherein the wake-up signal is a low voltage to pull the gate voltage of the PNP transistor and the first pin down.

6. The peripheral device as claimed in claim 5, wherein, during the timing period of the wake-up timer, the capacitor is discharged to a low voltage which can drive the peripheral device into the work mode.

7. The peripheral device as claimed in claim 5, wherein the timing period of the wake-up timer is between 150 ms and 300 ms.

8. The peripheral device as claimed in claim 2, wherein, when the portable electronic device is in the work mode, the portable electronic device supplies a working voltage to the interface circuit through the second pin.

9. The peripheral device as claimed in claim 8, wherein the working voltage is 3.2 volts.

10. The peripheral device as claimed in claim 2, wherein, when the portable electronic device is in the work mode and the input port does not receive any input signal during a predetermined period, the voltage of the second pin is pulled low to make the portable electronic device enter the sleep mode.

11. The peripheral device as claimed in claim 10, wherein the set period is between 3 and 10 seconds.

12. The peripheral device as claimed in claim 1, wherein the first pin is a pin with a great capacity for pulling high.

13. The peripheral device as claimed in claim 1, wherein the second pin is a pin to drive the peripheral device.

14. The peripheral device as claimed in claim 1, wherein the input device controller is a controller of a keyboard and the interface circuit is built in the keyboard.

15. A peripheral device for a portable electronic device, the peripheral device coupled to a wake-up pin and a working pin of the portable electronic device, wherein, when the peripheral device is in a work mode, the portable electronic device supplies a first high voltage from the work pin; when the portable electronic device is in a sleep mode, the portable electronic device supplies a first low voltage from the work pin and the wake-up pin maintains a second high voltage; and when a second low voltage is input to the wake-up pin, the portable electronic device goes from the sleep mode to the work mode, the peripheral device comprising:

a power storage device;

an input device controller coupled to the power storage device;

a first diode for conducting electricity from the working pin to the power storage device; and a second diode for conducting electricity from the wake-up pin to the power storage device;

wherein, when the portable electronic device is in the work mode, the power storage device is charged by the first high voltage; when the portable electronic device is in the sleep mode, the power storage device is charged by the second high voltage; during the process of the portable electronic device in sleep mode entering work mode, the portable electronic device supplies the first low voltage from the work pin, the wake-up pin has the second low voltage, and the power storage device is discharged to maintain the peripheral device working.

16. The peripheral device as claimed in claim 15, wherein the power storage device is a capacitor.

17. The peripheral device as claimed in claim 15 further comprising:

a resistor with a first terminal coupled to the input device controller and a second terminal coupled to the wake-up pin; and a PNP transistor, a gate of the PNP transistor coupled to the second terminal of the resistor, a source of the PNP transistor coupled to the first terminal of the resistor and a drain of the PNP transistor coupled to ground;

wherein, when the source voltage of the PNP transistor goes from a third high voltage to a third low voltage, the second low voltage is output from the gate of the PNP transistor to the wake-up pin.

18. The peripheral device as claimed in claim 15, wherein the input device controller further comprises a wake-up timer; wherein, when the output from the input device controller to the source voltage of the PNP transistor goes from the third high voltage to the third low voltage, the wake-up timer is started by the input device controller and the input device controller enters an sleep mode until the wake-up timer ends.

* * * * *